United States Patent [19]
Gold

[11] Patent Number: 6,154,109
[45] Date of Patent: *Nov. 28, 2000

[54] SUPERCONDUCTING INDUCTORS

[75] Inventor: Calman Gold, Londonderry, N.H.

[73] Assignee: American Superconductor Corporation, Westborough, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/384,781

[22] Filed: Feb. 6, 1995

[51] Int. Cl.[7] ................ H01F 1/00; H01F 5/00
[52] U.S. Cl. ................ 335/299; 335/299; 335/216
[58] Field of Search ................ 336/DIG. 1, 55, 336/174, 175; 323/360, 355, 306; 335/216, 299

[56] References Cited

U.S. PATENT DOCUMENTS

| | | | |
|---|---|---|---|
| 3,664,143 | 5/1972 | Carroll | 62/3 |
| 3,739,255 | 6/1973 | Leppert | 321/16 |
| 4,700,257 | 10/1987 | Bekhaled | 336/DIG. 1 |
| 5,107,240 | 4/1992 | Tashiro et al. | 336/60 |
| 5,250,901 | 10/1993 | Kaufman et al. | 324/318 |
| 5,329,225 | 7/1994 | Roshen et al. | 323/360 |
| 5,345,208 | 9/1994 | Dorri et al. | 335/101 |
| 5,347,168 | 9/1994 | Russo | 307/245 |
| 5,412,363 | 5/1995 | Breneman et al. | 335/216 |
| 5,539,366 | 7/1996 | Dorri et al. | 335/294 |
| 5,614,880 | 3/1997 | Palkovich | 335/299 |

OTHER PUBLICATIONS

Patent Abstracts of Japan, Publication No. 03151606, Publication Date; Jun. 27, 1991; Title: Inductor Element; 1 page.
Copy of International Search Report mailed May 21, 1996.

*Primary Examiner*—Michael L. Gellner
*Assistant Examiner*—Anh Mai
*Attorney, Agent, or Firm*—Fish & Richardson P.C.

[57] ABSTRACT

The invention is an inductive device featuring very low losses even in circuits which supply more than about 10 kilowatts of power. The device includes an inductor comprising a core consisting primarily of a highly permeable magnetic material and at least one winding of a high temperature superconducting conductor contained substantially within the core and in spaced relation with respect to the core sufficient to maintain its electrical integrity, refrigeration means for cryogenically cooling at least the conductor winding portion of the inductor to a temperature at which each conductor winding exhibits superconductivity, and input/output means for providing power to and receiving power from each conductor winding. Also disclosed are a balancing choke and a circuit embodying a common mode inductor made in accordance with the invention.

30 Claims, 3 Drawing Sheets

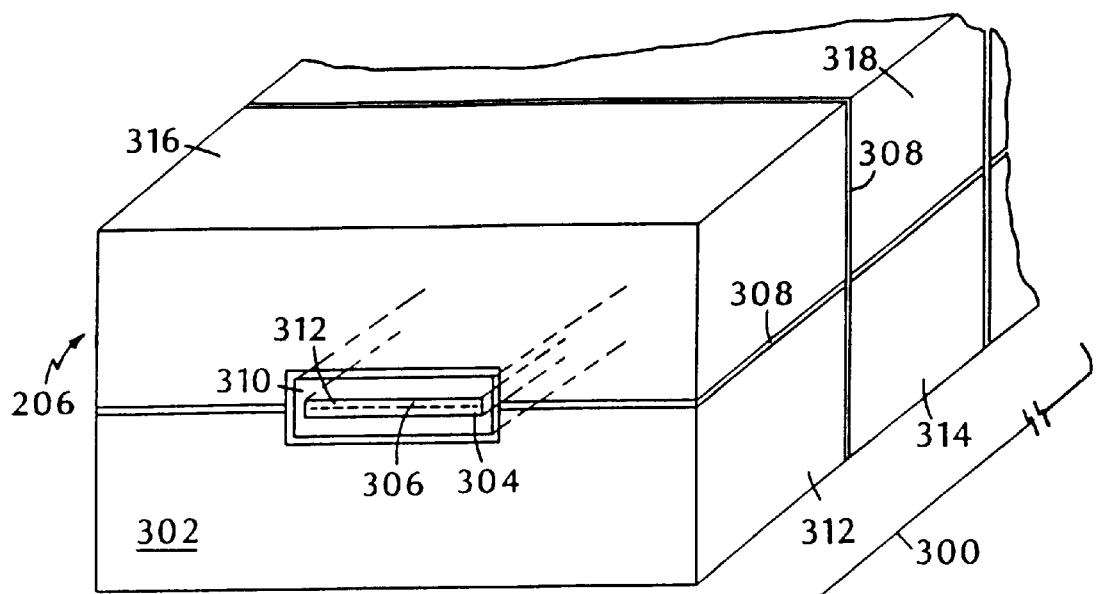
FIG. 3
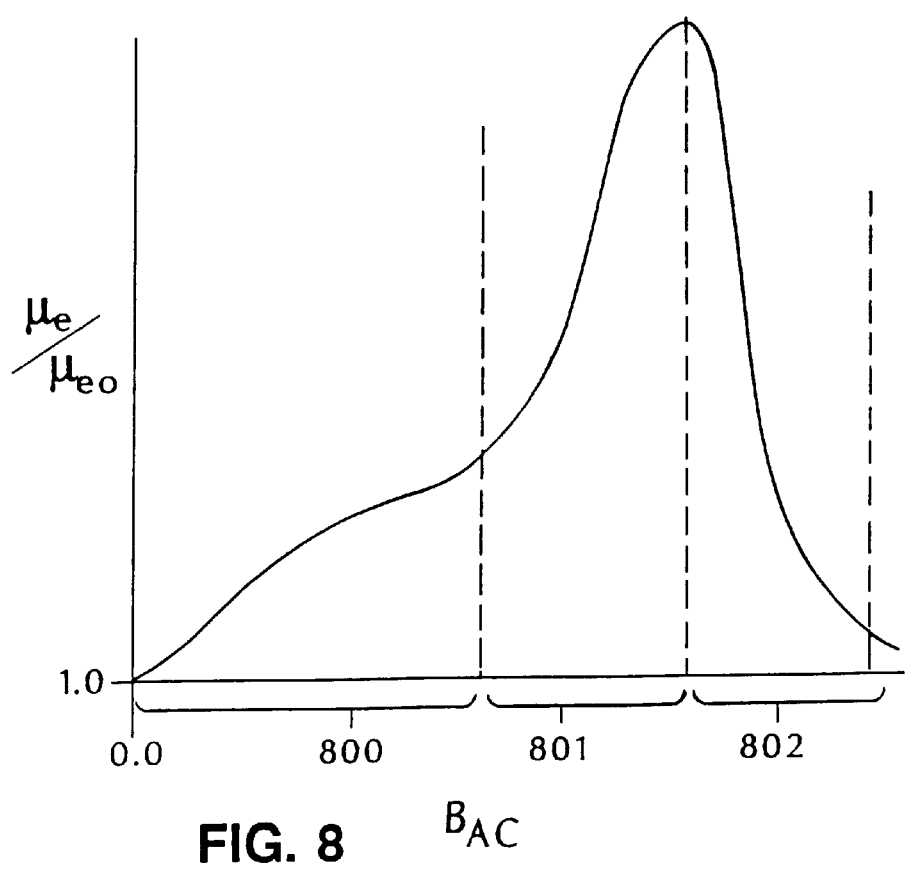
FIG. 8 $B_{AC}$

SUPERCONDUCTING INDUCTORS

FIELD OF THE INVENTION

This invention relates to inductors, and in particular, to novel cryogenic inductor designs suitable for high temperature superconducting oxide conductors.

BACKGROUND OF THE INVENTION

Various types of inductors, such as chokes and saturable core reactors, are used in electrical power generation, conversion and transmission applications. For example, chokes may be used to reduce the AC ripple in a rectified current or as components of EMI filters to remove high frequency interference, while saturable core reactors have been used in magnetic switches for voltage regulation. Conventional inductors for electrical power applications are usually formed by winding many turns of a conventional conductor, such as copper wire, either around an air core or around a central core of high permeability material, such as steel. Inductors which use either type of core may have significant disadvantages for electrical power applications which must carry high currents or sustain multi-kilowatt power loads. FIG. 1 shows a cutaway view of a conventional air core inductor, including multiples turns of conductor, 100. Since inductance is a function of the number of turns of the conductor and the permeability and geometry of the core material, air core inductors need to be extremely large and heavy and to use a great deal of wire to achieve large inductances. Not only is there an upper limit on the inductance obtainable in small geometries, but air core inductors have high leakage and stray flux which interfere with other parts of the system and defeat the goals of many electrical power system designs.

In consequence, a highly permeable core is employed in many conventional inductor designs to permit the desired inductance to be achieved with fewer turns of conductor and to constrain the flux to a controlled path within the core to limit stray leakage. However, the approach is not without consequences. Large and highly dissipative structures are needed to control flux density and core temperatures to prevent saturation of the core and to limit the operating temperature of the windings for a desired energy storage. The larger the physical size of the inductor, the larger the problem since the volumetric heat generation is a constant while the surface area of the inductor winding, from which heat is rejected, does not scale linearly with volume. Often, these cores are designed with a high reluctance air gap to prevent magnetic saturation of the entire inductor in the presence of a high DC bias with additional AC flux. The resulting reduction in permeability requires a compensatory increase in the number of turns of winding required to maintain the desired inductance, and increased conductor area is then required to reduce dissipative levels within the windings to acceptable levels. As an additional consequence of introducing an air gap, the gap length must be limited to control fringing and leakage flux. Distributed air gap cores, formed by compressing and sintering powdered iron or iron alloys, can be used to solve this problem, but limitations exist on the size of commercially available individual cores of this type due to the compressive forces required in the manufacturing process. In short, conventional inductor designs are inherently large, heavy and lossy at electrical power frequencies, particularly in designs intended to carry more than 50 amperes of current or to provide multi-kilowatt power capacity, and these designs must use extremely long lengths of conductor to obtain desired inductances. In power system designs based on magnetic linkages between multiple inductors, these problems are exacerbated.

The disadvantages of these conventional designs become even more pronounced when the use of high temperature superconductor windings is considered. High temperature, or oxide, superconductors have many desirable electrical and magnetic properties, of which the most notable for inductor applications is the near complete absence of losses when carrying DC currents. In addition, when cooled to a superconducting state, they are capable of carrying very high currents, with densities of thousands of times that of conventional copper conductor. Thus, they have gained increasing attention for having the potential to improve the efficiency of electric power and magnetics applications, particularly those involving currents with a large DC bias. AC losses do occur, varying with frequency, AC and DC amplitude and conductor geometry but they are much lower than those in conventional conductors. At 60 Hz and 77K, the effective resistance of a superconducting composite would be less than 1/10,000 of the effective resistance of a conventional copper conductor operated at ambient temperature. Oxide superconductors also have ability to maintain these properties at relatively high cryogenic temperatures, in the general range of the boiling point of nitrogen. In this temperature range,(unlike the much lower range of temperatures at which low temperature superconductors operate), coolants are relatively inexpensive and safe to handle, and FETs and other electronic devices may also be operated, making possible the design of complex power systems such as DC power supply systems including fault current limiters and filters. Thus, the use of oxide superconductors in conventional air core inductor designs has been proposed, particularly in cases where resistive losses needed to be minimized or the acoustic noise level associated with air gapped core designs was unacceptable.

However, the potential benefits of oxide superconductors are offset by some very significant physical limitations which limit their suitability for conventional inductor designs. High temperature superconductors are not metals, but fragile, brittle, ceramic-like compounds which cannot be drawn into traditional conductor forms in their natural state. Traditional conductor forms such as wires, tapes, and cables are generally made by forming composites of one or more high temperature superconductive filaments in combination with noble metals, such as silver, to form more ductile conductors. However, these composite conductors are still brittle by the standards of conventional conductors, and cannot be wound or otherwise bent to a tight radial arc without a reduction of available current density. High temperature superconducting composites would not stand up to the winding stresses of conventional inductor designs. Because of their high noble metal content, they are also quite expensive in comparison to conventional copper conductors, a very significant factor if large amounts of conductor are to be used in the design. In addition, the cost of cooling the entire winding to cryogenic temperatures must be factored in, and the large size of the structure adds significantly to the thermal loading of the necessary cryorefrigerator. A practical design for a superconducting inductor specifically adapted to the strengths and limitations of high temperature superconducting conductors has yet to be provided.

Thus, an object of this invention is to provide novel inductor designs that will allow a high temperature superconducting composite to provide the conducting portion of an inductor.

Another object of the invention is to provide improved inductor designs with extremely low resistive losses in comparison to conventional designs for high power, high current applications at power frequencies.

Another object of the invention is to provide relatively lightweight, compact inductor designs for high current or high power applications.

Another object of the invention is to provide inductor designs for high current applications with improved performance characteristics under transient conditions.

SUMMARY OF THE INVENTION

The invention delivers inductance with very low losses by embedding an inductor of novel design in a cryogenically cooled environment. It is particularly well adapted for high power and/or high current applications. By "high power and/or high current applications" are typically meant those where the required current capacity exceeds about 50 amperes and/or the required power capacity exceeds about 10 kilowatts. The inductor comprises a core consisting primarily of a highly permeable magnetic material and at least one winding of a conductor contained substantially within and in spaced relation sufficient to maintain its electrical integrity with respect to the core, wherein the conductor comprises a high temperature superconducting material. By "highly permeable" is meant a relative permeability with respect to free space in the range of about 50–5000. Preferred core materials include iron, nickel and their alloys, molypermalloy, and high permeability glassy metals. The core volume and dimensions must be selected so that the cross-sectional area of the core is sufficient to avoid saturation at the desired current-carrying capacity and the ratio of the total core cross-section to the magnetic path length is proportional to the ratio of the desired inductance to the relative permeability of the core material. Any form of conductor, such as wires, tapes or cables, may be used. Multifilamentary composite superconducting materials are preferred. Preferred high temperature superconducting materials include members of the bismuth family, the rare earth family, the thallium family and the mercury family. In a preferred embodiment, the spaced relation is maintained by an electrical insulator interposed between the core and each winding. The inductor is cryogenically cooled to a temperature at which the conductor exhibits superconductivity by a refrigeration device including a refrigeration enclosure for the inductor and refrigeration equipment. Connections for providing power to each winding are provided over lines 22 which are connected to a power source 18, which can be a DC or AC power source or some combination of the two. Current is provided to the conductor which then operates to generate inductance with very low losses. Generally, the current carrying capacity of such a device will be at least about 50 amperes. Inductive devices using multiple windings and high power, low loss circuits including these devices may be made in accordance with the invention. In its most general form, a low loss circuit providing at least about 10 kilowatts of power may be made comprising a plurality of circuit elements in a circuit configuration, said elements including at least one power source and further including an inductor which comprises a core consisting primarily of a highly permeable magnetic material and at least one winding of a conductor contained substantially within and in spaced relation sufficient to maintain its electrical integrity with respect to the core, wherein the conductor comprises a high temperature superconducting material, refrigeration means for cryogenically cooling at least the conductor winding portion of the inductor to a temperature at which each conductor winding exhibits superconductivity, and input/output means for providing power to and receiving power from each conductor winding, said circuit providing at least about 10 kilowatts of power. In a specific aspect of the invention, a circuit embodying a balancing choke may be made in accordance with the invention with a single power source and an inductor comprising a plurality of conductor windings inside the core, wherein the input means provide power to each conductor winding from the power source, and wherein the circuit further comprises means for applying a separate load to each conductor winding. In another specific aspect of the invention, a circuit embodying a common mode inductor may be made in accordance with the invention by providing a plurality of conductor windings inside a single core and providing in the circuit means for applying balanced, countervailing loads to each of said windings. In one aspect of the invention, a return path may be provided for a circuit embodying the invention by means of a second coaxially disposed conductor, preferably superconducting, contained substantially outside and maintained in spaced relation sufficient to maintain its electrical integrity from the core preferably by an insulator.

In other embodiments, combinations of similar systems with different electrical configurations can be used to build filters, delay lines, surge reactors, current limiters and energy storage devices. Depending on the constraints of the design, one, many, or all of the components can be operated at reduced temperatures.

BRIEF DESCRIPTION OF THE DRAWINGS

Other objects, features, and advantages of the invention will be apparent from the following description taken together with the drawings in which:

FIG. 3 is a cross-sectional view of a preferred embodiment of the inductor represented in FIG. 2.

FIG. 8 is a graph showing the variation with a magnetic field induced by AC current of the effective core permeability (relative to the core permeability at zero field) of certain preferred core materials comprising iron.

DETAILED DESCRIPTION OF THE INVENTION

Figure 1:
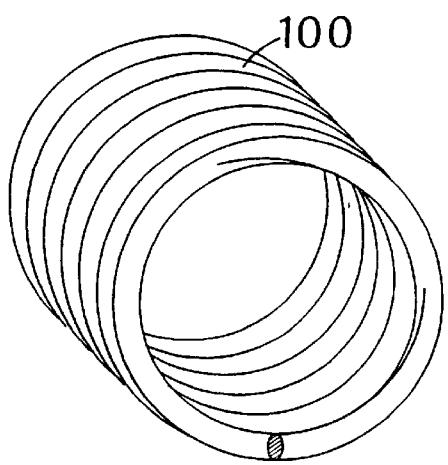
FIG. 1 is a cutaway view of a conventional air core inductor.
Figure 2:
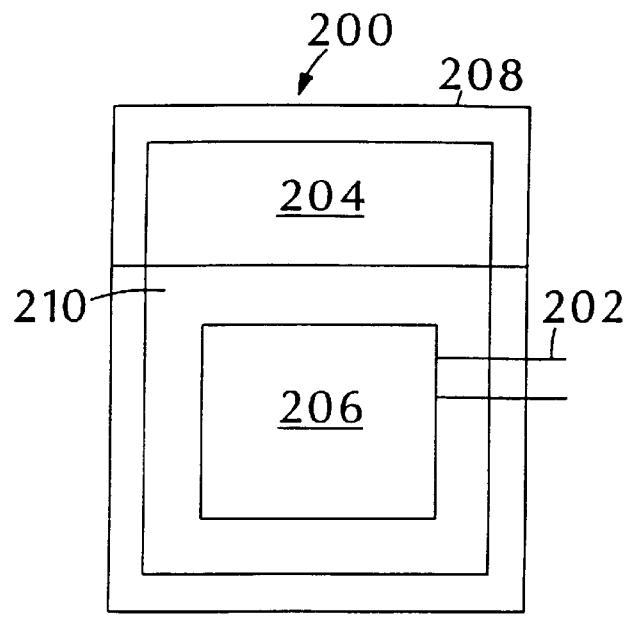
FIG. 2 is a schematic representation of an inductive device configured in accordance with a preferred embodiment of the invention.

In accordance with the invention, referring to FIG. 2, an inductive device 200 is provided which, in comparison to conventional inductors, delivers high inductance with greatly reduced power dissipation from winding resistance and core losses, especially for high current and/or high power applications. By "high power and/or high current applications" are typically meant those where the required current capacity exceeds about 50 amperes and the required power capacity exceeds about 10 kilowatts. The device performs well at power frequencies, from about 0 Hz to about 50 kHz, and particularly where the current has a strong DC or low frequency AC bias.

The device includes an inductor 206 of novel design in a cryogenically cooled environment provided by a refrigeration device 208. In its most general embodiment, as shown in FIG. 3, the inductor 206 comprises a core 300 consisting primarily of a highly permeable magnetic material 302 and at least one conductor winding 304 contained substantially within and in spaced relation sufficient to maintain its electrical integrity with respect to the core 300, wherein the conductor comprises a high temperature superconducting material 306. By "highly permeable" is meant a permeability with respect to the permeability of free space in the range of 50–5000. The core volume and dimensions must be selected so that the cross-sectional area of the core is sufficient to avoid saturation at the desired current-carrying capacity and the ratio of the total core cross-section to the magnetic path length is proportional to the ratio of the desired inductance to the relative permeability. A spaced relation is necessary in order to electrically insulate the winding 304 from the core 300, without which shorting will occur if the core is electrically conductive, as most are.

Returning to FIG. 2, the refrigeration equipment is provided in section 204 of the refrigeration device 208 and the inductor 206 is contained in a refrigeration enclosure 210. Input/output means for providing power to and receiving power from each winding are provided over lines 202. When used in a circuit configuration, inductive device 200 will typically be used with at least one power source, which can be a DC or AC power source or some combination of the two, with or without other circuit elements.

A feature of the inventive system is that large values of inductance exhibiting high current carrying capacity can be provided without the penalties in size, weight and power dissipation that would encountered using conventional inductor designs. Conventional inductors tend to grow in size in proportion to the product of the inductance with the square of the current. In fact, the loss issues cause them to grow faster. As previously discussed, Joule heating due to resistive losses is a significant problem in any inductor which uses conventional conductor materials such as copper or aluminum. Large and highly dissipative structures including ducting or increased conductor cross-sections are then required to compensate so that the operating temperature of the windings and insulation does not exceed the rated tolerances for the desired energy storage. Conductor volume in the inventive design need only be a few thousandths of the volume of a conventional conductor with the same current-carrying capacity because of the extremely high current densities of high temperature superconducting materials. Moreover, Joule heating is not a significant issue in the inventive design as dissipative losses are negligible and fully compensated by the refrigeration system. Any significant temperature rise of the inductor 206 must be prevented by the refrigeration device 208 in order to maintain the conductor in its superconducting state. An additional advantage is that maintaining the inductor 206 at a constant low temperature also increases the operational life of any insulation which may be used to maintain the spaced relation between the core 300 and each winding 304.

However, the dissipative losses of conventional inductor designs are an energy cost, and so are the power requirements necessary to maintain the inventive inductor in its superconducting state. The energy saving advantages of using the cryogenically cooled system of the present invention would not be obvious to one practiced in the art. Powering the refrigeration device 208 to cool the inductor requires substantial energy, and the cost of that energy must be offset by energy savings from the use of the design.

The refrigeration device 208 may be provided in either of two ways. The simpler one is to install the inductor in a thermos dewar filled with liquid nitrogen or another suitable coolant and to replenish the coolant as necessary. Liquid nitrogen costs about as much as milk; nonetheless without information about the refill system mechanics which would need to be included as part of the refrigeration equipment 204, the energy cost of such a system would be hard to calculate generically. Alternatively, a mechanical cryorefrigerator can be attached to the inductor enclosures to maintain the inductor at a desired temperature. Refrigeration of the inductor can be achieved either by conduction cooling or by reflux condensation of the vapors of a liquid cryogen such as liquid nitrogen. The energy justification for selecting the inventive inductor is clear if it is assumed that the cryorefrigerator is operating at 77K and requires about 40–50 watts of input power per watt extracted. For a commercially available cryorefrigerator made by Leybold Vacuum Products of Export, Pa., a 1.5 kilowatt input power produces 14–15 watts of cooling at 77K, and larger machines are generally more efficient. In a 900 ampere, 11 mH inductor made in accordance with the invention and carrying a DC current, the dissipative losses from the inductor will be negligible, on the order of milliwatts. The primary thermal load will be the 900 ampere current leads, which will impose a constant load of 10–12 watts, although there will also be thermal losses from other portions of the system, such as the dewar, which will vary from system to system and may cumulate to as much as a kilowatt. However, the total energy cost, including the thermal losses, for a system including a well-designed cryorefrigerator, is likely to be on the order of the cooling penalty, i.e. about 2.5 kilowatts for the example given. This is not a significant penalty compared to the dissipation costs of conventional inductor designs in high-power, high current applications. At 900 amps and 11 mH, the dissipation of a conventional air core inductor was measured as 35 kW. Thus, using the inventive inductor with a 1 kW cryorefrigerator may save about 32.5 kW. The savings are even greater when the costs of cooling the conventional inductor are considered.

The core 300 is preferably made from a high permeability material selected for superior properties at cryogenic temperatures. Iron, nickel, and their alloys, molypermalloy (MPP), and high permeability glassy metals, especially two component transition-metal amorphous alloys stabilized by metalloids, are preferred for the core material 302. Ferrite materials would generally not be suitable because their unique heat-embedded crystal structure severely limits their temperature stability. Among the glassy metals, most alloys stabilized by rare earths would not be suitable, although yttrium, lanthanum, gadolinium, and lutecium stabilized alloys might be used. Distributed air gap core materials, such as the molypermalloy materials available from Magnetics Inc of Butler Pa. or the cores of powdered iron with a resin binder available from Micrometals Inc of Goleta Calif. are generally preferred for the majority of inductor applications in which core saturation under operating conditions is not desired. Powder core materials are particularly suitable for use when the inductor is intended to carry a current with a high frequency AC component, as when the inductor will be used in an EMI filter. However, linear or saturable core materials such as certain of the METGLAS amorphous metals available from Allied Signal of Morristown, N.J. are preferred for applications where, in the course of its normal operation, the core is operated in both saturated and unsaturated states.

The core 300 may be a unitary piece of material, or as shown in FIG. 3, pieces of core material 312, 314, 316, 318 . . . in, for example, commercially available sizes and configurations, may be strung on the winding 304. The small air gaps 308 between the pieces of core material will not substantially affect the operation of the invention. Although it is preferred that the conductors be contained substantially within the core, in some embodiments of the invention, individual strips of conductor may be spliced outside the core without affecting the operation of the invention. This may be done for example, to reverse direction in order to form a more compact arrangement.

Those skilled in the art will recognize that, as with any inductor, once the desired inductance is selected, the total volume and dimensions of the core 300 must be selected with regard to the relative permeability of the core material 302 so that the cross-sectional area of the core is sufficient to avoid saturation at the desired current-carrying capacity and the ratio of the total core cross-section to the magnetic path length is proportional to the ratio of the desired inductance to the relative permeability. The required relationships are described by the well-known equations: $L = \mu_o \mu_e N^2 A_e / 1_e$ and $B_{max} \alpha 1/A_e$, where L is the desired inductance of the inductor 206, $\mu_o$ is the permeability of free space, $\mu_e$ is the relative permeability of the core material 302, N is the number of turns in the winding (which will typically be one or some other low number for inductors made in accordance with the invention), $A_e$ is the total area of the core cross-section, $1_e$ is the magnetic path length through the core, which is determined by its dimensions, and $B_{max}$ is the peak operating flux density of the core. Those skilled in the art will also recognize that for high AC currents, the AC contribution to $B_{max}$ will be inversely proportional to the frequency, f, and to N as well as to $A_e$, and will be directly proportional to the magnitude of the AC signal, relations which again hold true for all inductors.

A spaced relation sufficient to maintain electrical integrity must be maintained between the core and each winding. In the preferred embodiment shown in FIG. 3, the spaced relation between the core 300 and the conductor is maintained by an electrical insulator 310 interposed between the core 300 and the winding 304. Insulation may be provided by an air gap with or without spacers, or another gas or liquid insulator, but is preferably provided by a solid insulator made from a material 314 selected for superior properties at cryogenic temperatures. Since most highly permeable materials are also electrical conductors, it will need to be a good electrical insulator. Since it must also provide mechanical protection and structural support for the fragile superconductor in use, it must be strong, and not become brittle or dimensionally unstable at cryogenic temperatures. It must be machinable, so that fine slots or holes to contain the superconductors can be provided. The superconductor and insulation may then be preassembled before insertion in the core. It is preferred that thermal insulation be provided by the insulator as well. This is of limited importance in the pure DC case, as the core has a very high thermal mass, but may serve to protect the composite from joule heating by the core when AC currents are being carried by the inductor. Preferred insulator materials include polycarbonates such as the LEXAN material available from E I DuPont de Nemours of Wilmington, Del., and epoxy/glass composite materials.

Although the invention may use any conductor comprising a high temperature superconducting material, it is particularly well-adapted for multifilamentary composite superconducting materials comprising filaments of superconducting oxides 306, in intimate contact with a noble metal matrix 312, such as those produced using the well-known powder in tube (PIT) process. Composites of superconducting oxide materials in intimate contact with a noble metal matrix are desirable because they offer better mechanical properties than the brittle superconducting oxides alone can provide. The matrix material selected must be readily formable and must be non-reactive with respect to the superconducting material so that the latter's properties are not degraded in its presence. By "noble metal", as that term is used herein, is meant a metal which is substantially non-reactive with respect to oxide superconductors and precursors and to oxygen under the expected conditions (temperature, pressure, atmosphere) of manufacture and use. Preferred noble metals include silver (Ag), gold (Au), platinum (Pt), palladium (Pd) and alloys of these metals. Silver and its alloys, including oxide dispersion strengthened (ODS) silver, are lowest cost, and therefore most preferred for large-scale manufacturing. The invention may be practiced with any desired oxide superconductor, such as the bismuth family of oxide superconductors (bismuth-strontium-calcium-copper-oxide), the yttrium family of oxide superconductors (yttrium-barium-copper-oxide); the thallium family of oxide superconductors (thallium-barium-strontium-calcium-copper-oxide), the mercury family of oxide superconductors (mercury-barium-strontium-calcium-copper-oxide), and their commonly known variants. Typically, the oxide superconductor is selected for its superior electrical properties, such as high critical temperature or critical current density. Members of the bismuth family such as BSCCO 2212 and 2223 are particularly preferred.

In making the present invention, any conductor form, such as tapes, wires or cables, may be used to form the windings. However, it is a feature of the invention that flattened forms such as tapes may offer advantages in minimizing AC losses in inductive devices made in accordance with the invention. This is not an obvious advantage, as symmetric conductor forms are generally considered to provide AC loss minimizing characteristics. To understand the advantage it is important to understand that, unlike copper and silver conductors, the electrical and magnetic properties of high temperature superconducting composites are non-linear with frequency and are influenced by the presence of both external and self-generated internal fields. When the device illustrated in FIG. 3 carries a significant AC current, the transverse magnetic field on the tape 304 is reduced by the ratio of the relative permeability of the core material 302 to the relative permeability of the insulator material 314. Since any fluctuating transverse field induces eddy currents, a significant component of AC loss in superconducting composites, reducing the magnitude of the transverse field will effectively increase the current carrying capacity of the tape 304. Such a field reduction is particularly valuable in high current, high power AC applications where solutions involving the use of more wire to compensate for AC losses would otherwise have to be explored.

Figure 5:
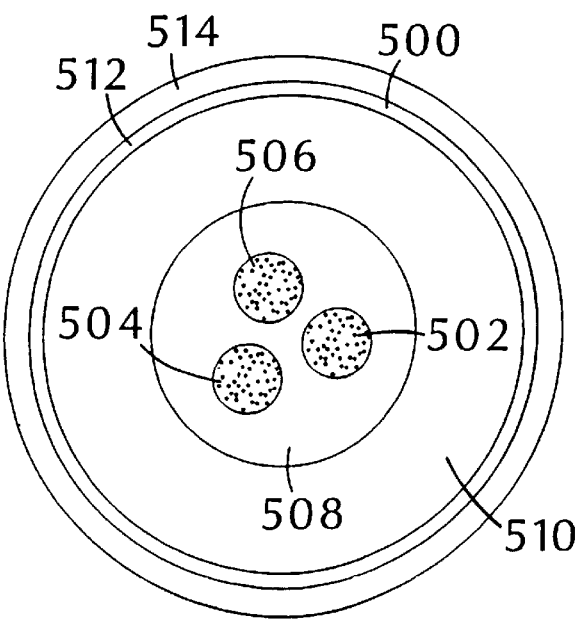
FIG. 5 is a cross-sectional view of device embodying a balancing choke suitable for use in the circuit of FIG. 4 and made in accordance with a preferred embodiment of the invention, and further embodying a suitable return path for the circuit.
Figure 4:
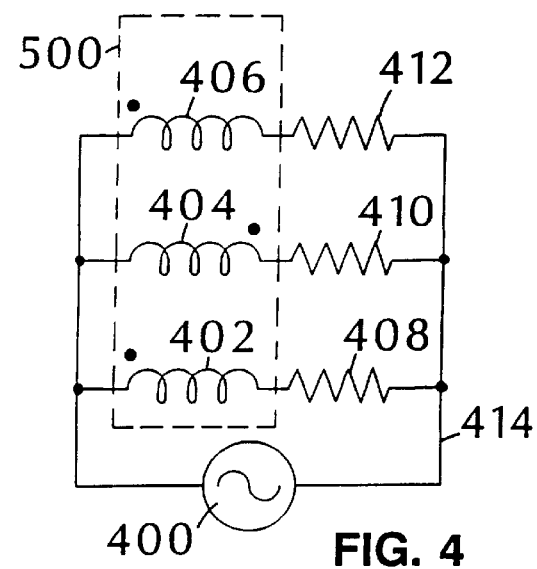
FIG. 4 is a circuit diagram of a circuit embodying a balancing choke.

Inductive devices using multiple windings and high power, low loss circuits including these devices may be made in accordance with the invention. In one aspect, a balancing choke may be made in accordance with the invention, by using a plurality of conductor windings contained substantially within and in spaced relation sufficient to maintain their electrical integrity with respect to a single core, each attached to a separate load at one end and to a single power source at the other. FIG. 4 shows a diagram of a circuit embodying a balancing choke 500. The circuit includes an AC power supply 400 attached to a first inductor 402, a second inductor 404, and a third inductor 406, and a circuit return path 414. First inductor 402 is attached to a first load 408, second inductor 404 is attached to a second load 410, and third inductor 406 is attached to a third load 412. FIG. 5 is a cross-sectional view of a device incorporating the balancing choke, 500, made in accordance with the invention, and an electrically isolated circuit return path 414. Referring first to the balancing choke portion of the device, the first inductor 402 consists of first superconducting winding 502 in combination with core 510, while the second inductor 404 consists of second superconducting winding 504 in combination with core 510, and the third inductor 406 consists of third superconducting winding 506 in combination with core 510. All windings are preferably maintained in spaced relation to the core by insulator 508. Variations in the current flowing through one winding will tend to induce countervailing flux in core 510 which will, in turn induce current in the other windings, tending to balance the current flow among the windings. In all embodiments of the invention, it is preferred that the conductors be arranged in substantial symmetry around the axis of symmetry of the core, but this is not an absolute requirement. Because of the strong flux capture properties of the core, moderate deviations from symmetry will not prevent the operation of the inductive devices, although it will increase the magnitude and asymmetry of the stray flux patterns. In one aspect of the invention, a return path, 414, may be provided for the circuit by means of a coaxially disposed conductor, 514, preferably superconducting, contained substantially outside and maintained in spaced relation sufficient to maintain its electrical integrity from the core 510, preferably by an insulator 512.

Figure 6:
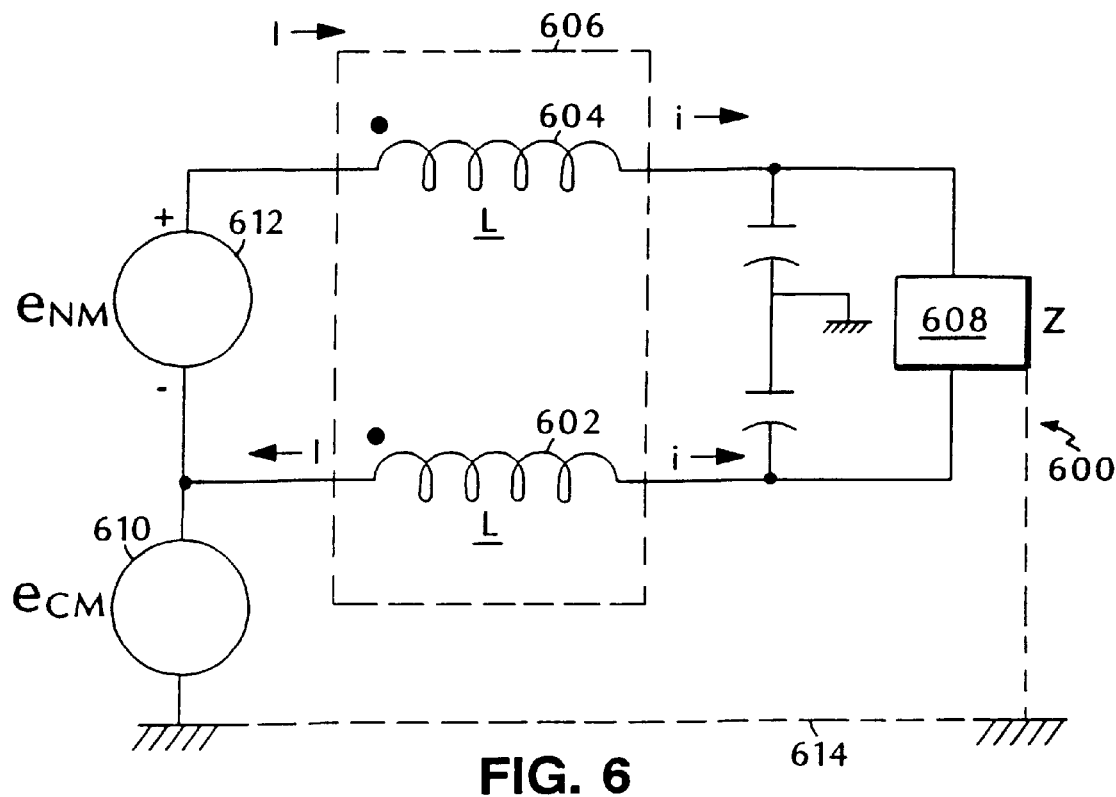
FIG. 6 is a circuit diagram of a circuit embodying a common mode inductor.
Figure 7:
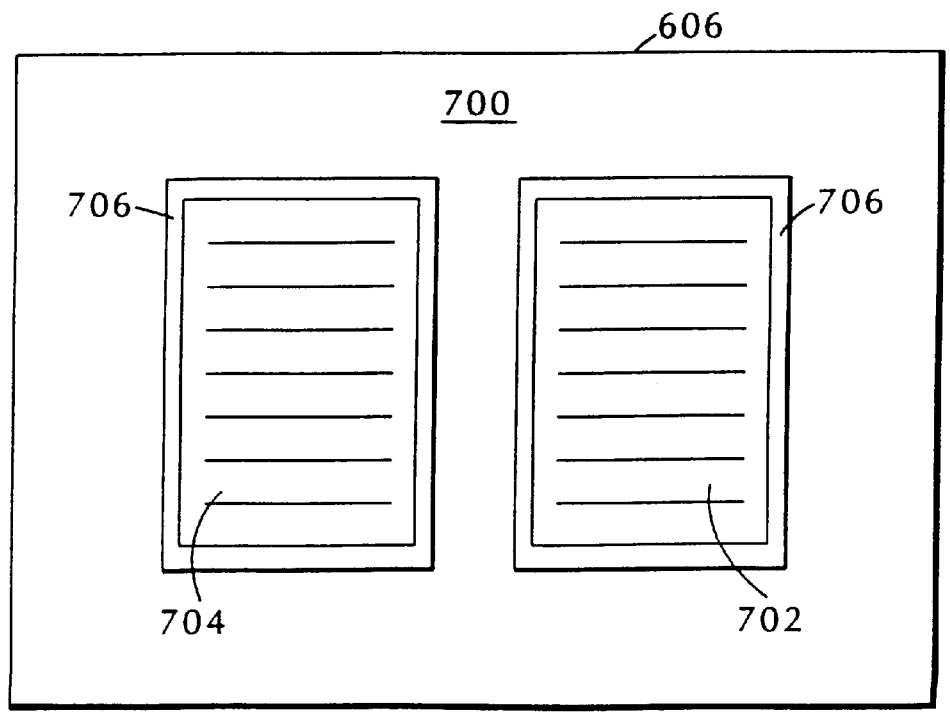
FIG. 7 is a cross-sectional view of a common mode inductor suitable for use in the circuit of FIG. 6 and made in accordance with a preferred embodiment of the invention.

In another aspect the invention may be used to make a common mode inductor substantially without the leakage flux which is a major limitation on the current carrying capacity of conventional common mode inductor designs. Common mode inductors are used in EMI filters to remove, for example, high frequency AC noise from rectified DC currents or from AC currents at power frequencies. The invention is particularly well adapted for applications which involve a large DC bias in combination with an AC component as it is capable of carrying substantially unlimited DC current without overheating or saturation. A circuit diagram incorporating a common mode inductor is shown in FIG. 6. Referring to FIG. 6, the circuit 600 includes a common mode signal generator ($e_{cm}$) 610, a normal mode signal generator ($e_{nm}$) 612, a load 608, and a common mode inductor 606 consisting of inductors 604 and 602. Both the load 608 and the common mode signal generator 610 are connected to ground 614. Because the current I driven by the normal mode signal generator 612 passes through the inductors 604 and 602 in opposite directions, the only load it sees is 608, while the current driven by the common mode signal generator 612 also sees a net reactance from the two inductors. A circuit embodying a common mode inductor in accordance with the invention may be made using a plurality of conductor windings contained substantially within and in spaced relation sufficient to maintain their electrical integrity with respect to a single core, and means for applying balanced, countervailing loads to each of said windings. Thus, for example, two conductors carrying DC current of equal magnitude but opposite direction, or 3 conductors carrying 60 cycle, 3 phase AC current may be used. The DC case is illustrated in FIG. 7, which is a cross-sectional view of a common mode inductor 606 made in accordance with the invention. Inductor 602 consists of first superconducting winding 702 contained within core 700, while inductor 604 consists of a second superconducting winding 704 with oppositely directed current contained within the same core 700, and maintained in spaced relation by insulators 706.

In theory, it is possible to apply very high inductances to the common mode component of the current in any implementation of a common mode inductor, but in practice, conventional inductors are limited by the need to avoid saturating the core material. For example, common mode inductors wrapped in a conventional manner on highly permeable core materials need to keep the temperature rise of the core material below its Curie temperature to avoid core saturation. Since the windings are on the outside of the core and both are subject to resistive losses, this significantly limits the number of turns which may be used. In the common mode inductor of the present invention, much higher inductances are obtainable, since there are no significant resistive losses in the conductor to heat the core, and induced current in the core itself is negligible. Even if the same core materials are used, the core properties will be far more stable at a constant 77K than they can be in a core which will be subject to temperature cycling above room temperature, so design safety factors can also be lower. A number of the preferred core materials, chiefly those comprising iron, have relative permeabilities which increase several times with increasing AC flux density before a reduction in relative permeability occurs. FIG. 8 illustrates the variations of effective core permeability relative to the core permeability at zero field of certain preferred core materials when the magnetic field induced by the AC component of the current is varied. This effect is most pronounced in powdered iron core materials, though it may appears to a lesser extent in any core materials comprising iron, and to a slight extent in other preferred core materials. For applications which must manage an AC ripple on top of and AC or DC current, such core materials may be selected for a normal range of operation in area 800, and current or field fluctuations are offset by increasing inductance due to higher effective permeability in area 801. For very high AC currents, such as might be caused by rare transients, the lossy region 802 of the core performance provides added protection for the system. At these fields, power dissipation will occur, but the power losses tend to damp out oscillations in frequency which could otherwise propagate the transient to other, more vulnerable parts of the power system.

It should be noted that because all of the inductors made in accordance with the invention exhibit a linear rather than a wound geometry, all have a constant inductance per unit length. They can moreover, be made to exhibit a constant capacitance per unit length by proper selection of the capacitance of the circuit return path using methods well known to those skilled in the art, as for example by using the coaxial return path illustrated in FIG. 5. Because the inductors have a well-controlled characteristic impedance per unit length, they will exhibit predictable behavior under transient conditions. Thus, it is possible to use these them in delay lines and amplifiers at low frequencies where this was not previously considered feasible. Furthermore, they will make better filters than systems using discrete inductors and capacitors.

The linear inductance featured by the invention provides additional advantages over conventional designs in inductors and transformers by providing much greater protection against short circuits caused by transient AC currents. In conventional multiturn inductors and transformers, a high voltage transient will generally cause dielectric breakdown and shorting in the air between the first few turns of the winding before it has time to propagate through the length of the winding. These shorts can burn out insulation and otherwise damage the equipment, much as a lightning strike might. Because the present inventions have linear geometries, turn-to-turn shorting cannot occur and the transient voltage will be distributed along the entire length of the inductor affected. While the core may then be driven into its lossy region and begin to heat up, the low normal operating temperatures of these inductor systems and the inclusion of a refrigeration device in the system provides additional assurance that heating will not be so intense as to damage the system components. Furthermore, because of the linear geometry of the inductor, very high frequency transients are less problematic than in conventional inductors since it is not necessary to be concerned about the self-resonances exhibited by coiled structures.

The invention permits the provision of greater inductances with lower power dissipation in such applications as filters, power supplies, chokes, delay lines, surge reactors, current limiters, and energy storage devices. It is particularly well adapted for high power and/or high current applications at power frequencies. Additions, subtractions, substitutions and other modifications of the described embodiments will be apparent to those practiced in the field, and are within the scope of the following claims.

What is claimed is:

1. An inductive device comprising:
   a linear inductor including a core including a linear geometry consisting primarily of a highly permeable magnetic material and at least one winding of a conductor enclosed within a bore of the core along the linear geometry of the core, and an insulator located between the core and the winding, the insulator being adapted to maintain the winding in spaced relation to the core along the linear geometry sufficient to maintain its electrical integrity with respect to the core, wherein the conductor comprises a high temperature superconducting material,
   a refrigerator configured to cryogenically cool the inductor to a temperature at which each conductor winding exhibits superconductivity,
   an input which provides power to each conductor winding; and
   an output which receives power from each conductor winding.

2. A device according to claim 1 wherein the current-carrying capacity of the device exceeds 50 amperes and the power capacity of the device exceeds 10 kilowatts.

3. A device according to claim 2 wherein the core primarily consists of a material having a relative permeability with respect to free space in the range of about 50 to 5000.

4. A device according to claim 3 wherein the conductor is a tape, wire or cable.

5. A device according to claim 4 wherein the conductor comprises a multifilamentary composite superconducting material.

6. A device according to claim 4 wherein the high temperature superconducting material comprises a material selected from the bismuth family, the rare earth family, the thallium family or the mercury family of oxide superconductors.

7. A device according to claim 6 wherein the high temperature superconducting material comprises a material selected from the bismuth family of oxide superconductors.

8. A device according to claim 3 wherein the core material is selected from among iron, nickel and their alloys, molypermalloy and high permeability glassy metals.

9. A device according to claim 8 wherein the core includes a cross sectional area, the volume and dimensions of which are selected so that the cross-sectional area of the core is sized to avoid saturation at the desired current-carrying capacity and the ration of the total core cross-section to the magnetic path length is proportional to the ratio of the desired inductance to the relative permeability of the core material.

10. A device according to claim 9 wherein the conductor is a tape comprising multifilamentary composite superconducting material and the superconducting material is selected from the bismuth family of oxide superconductors, wherein the core material is selected from the molypermalloy family of materials, and wherein the spaced relation between the core and each winding is maintained by an electrical insulator interposed between the core and each winding.

11. The inductive device of claim 1, wherein the linear inductor exhibits a constant inductance per unit length.

12. A low loss circuit comprising:
    a plurality of circuit elements in a circuit configuration, said elements including at least one power source and further including
        a linear inductor including a core including a linear geometry consisting primarily of a highly permeable magnetic material and at least one winding of a conductor enclosed within a bore of the core along the linear geometry, and an insulator located between the core and the winding, the insulator being adapted to maintain the winding in spaced relation to the core sufficient to maintain its electrical integrity with respect to the core, wherein the conductor comprises a high temperature superconducting material,
        a refrigerator which maintains, during operation of the inductor, at least one winding of the inductor at a temperature at which the conductor exhibits superconductivity, the linear geometry of the core is disposed within the refrigerator;
        an input which provides power to each conductor winding; and
        an output which receives power from each conductor, said circuit providing at least 10 kilowatts of power.

13. A circuit according to claim 12 embodying a common mode inductor wherein the inductor comprises a plurality of conductor windings enclosed within a bore of the core along the linear geometry of the core, and an insulator located between the core and the plurality of conductor windings, the insulator being adapted to maintain the windings in spaced relation to the core along the linear geometry of the core sufficient to maintain their electrical integrity with respect to the core, and wherein the circuit further comprises means for applying balanced, countervailing loads to each of said windings.

14. A circuit according to claim 12 embodying a balancing choke wherein the inductor comprises a plurality of conductor windings enclosed within a bore of the core along the linear geometry of the core, and an insulator located between the core and the windings, the insulator being adapted to maintain the windings in spaced relation to the core along the linear geometry of the core sufficient to maintain their electrical integrity with respect to the core, wherein the input means provide power to each conductor winding from the same power source, and wherein the circuit further comprises means for applying a separate load to each conductor winding.

15. A circuit according to claim 12 wherein a circuit return path is provided by means of a coaxially disposed conductor contained outside the core, and a second insulator, the second insulator being adapted to maintain the coaxially disposed conductor in spaced relation to the core sufficient to maintain its electrical integrity from the core.

16. The low loss circuit of claim 12, wherein the linear inductor exhibits a constant inductance per unit length.

17. An inductive device comprising:

a linear inductor including a core including a linear geometry consisting primarily of a material having a relative permeability with respect to free space in the range of about 50 to 5000 and selected from among iron, nickel and their alloys, molypermalloy and high permeability glassy metals, and further comprising at least one winding of a first conductor enclosed within a bore of the core along the linear geometry of the core and an insulator located between the core and the winding of the first conductor, the insulator being adapted to maintain the winding of the first conductor in spaced relation to the core sufficient to maintain its electrical integrity with respect to the core, wherein the first conductor is a tape, wire or cable and comprises a high temperature multifilamentary composite superconducting material selected from the bismuth family of oxide superconductors, a second conductor disposed external to and coaxially with respect to the linear geometry of the core and maintained in spaced relation from the core to maintain its electrical integrity from the core, a refrigerator adapted to cryogenically cool at least the first conductor portion of the inductor to a temperature at which the first conductor exhibits superconductivity, an input which provides power to each conductor winding;

an output which receives power from each conductor winding, and wherein the current-carrying capacity of the device is greater than 50 amperes and the power capacity of the device is greater than 10 kilowatts.

18. The inductive device of claim 17, wherein the linear inductor exhibits a constant inductance per unit length.

19. A cryogenically cooled inductor apparatus comprising:

a refrigeration enclosure, a linear inductor contained in the refrigeration enclosure, said linear inductor including a core including a linear geometry consisting primarily of a highly permeable magnetic material and at least one conductor contained within the core along the linear geometry, and an insulator located between the core and the conductor to maintain electrical isolation between the core and the conductor, an input which provides power to the conductor, and an output which receives power from the conductor, and wherein said conductor comprises a high temperature superconducting material.

20. The inductor apparatus of claim 19, wherein the inductor further comprises a second conductor, and the first and second conductors are spliced together outside of the core.

21. The inductor apparatus of claim 19, wherein the core comprises a material selected from the group consisting of iron, iron alloys, nickel, nickel alloys, molypermalloy, and high permeability glassy metals.

22. The inductor apparatus of claim 19, wherein the first conductor is a tape, wire or cable.

23. The inductor apparatus of claim 22, wherein the first conductor comprises a multifilamentary composite superconducting material.

24. The inductor apparatus of claim 22, wherein the high temperature superconducting material comprises a material selected from the group consisting of the bismuth family, the rare earth family, the thallium family, and the mercury family of oxide superconductors.

25. The inductor apparatus of claim 19, wherein the current-carrying capacity of the device is greater than 50 amperes and the power capacity of the device is greater than 10 kilowatts.

26. The cryogenically cooled inductor apparatus of claim 19, wherein the linear inductor exhibits a constant inductance per unit length.

27. A superconducting inductor apparatus cryogenically cooled within a refrigerator unit, the inductor apparatus comprising:

a linear inductor configured to be contained in a refrigeration enclosure, said inductor including a core including a linear geometry and a conductor, said core comprising a highly permeable magnetic material, wherein said conductor comprises a high temperature superconducting material, is electrically isolated from said linear geometry of the core by an insulator and is enclosed within a bore of the core along the linear geometry.

28. The superconducting inductor apparatus of claim 27, wherein the linear inductor exhibits a constant inductance per unit length.

29. A superconducting inductor apparatus cryogenically cooled within a refrigerator unit, the inductor apparatus comprising:

a linear inductor configured to be contained in a refrigeration enclosure, the linear inductor including a linear conductor enclosed within a bore of a linear core, the linear conductor having a high temperature superconducting material, the linear core including a highly permeable magnetic material, and a linear insulator electrically isolating the superconducting material of the linear conductor from the linear core.

30. The superconducting inductor apparatus of claim 29, wherein the linear inductor exhibits a constant inductance per unit length.

* * * * *